United States Patent [19]

Takei et al.

[11] 4,253,620

[45] Mar. 3, 1981

[54] WINDING SPRING FOR SEAT BELT WINDING APPARATUS

[75] Inventors: Mitsuo Takei, Ohmiya; Toshiyuki Yashiro, Kawaguchi; Noboru Owatari, Ohmiya; Kazuo Takagi, Tokyo, all of Japan

[73] Assignees: Nippon Kinzoku Co., Ltd.; NSK Warner Kabushiki Kaisha, both of Japan

[21] Appl. No.: 78,938

[22] Filed: Sep. 26, 1979

[30] Foreign Application Priority Data

Sep. 29, 1978 [JP] Japan .................. 53-120856

[51] Int. Cl.³ .................. A62B 35/00; B65H 75/48
[52] U.S. Cl. .................. 242/107; 185/37; 267/156
[58] Field of Search .................. 242/107–107.7; 185/37; 267/156–157; 280/803, 806–808; 29/173; 297/474–478

[56] References Cited

U.S. PATENT DOCUMENTS

| | | | |
|---|---|---|---|
| 2,647,743 | 8/1953 | Cook | 267/156 |
| 3,337,155 | 8/1967 | Binding | 242/107 |
| 3,363,891 | 1/1968 | Foster | 267/156 |
| 3,788,631 | 1/1974 | Aldous | 267/156 |
| 4,084,764 | 4/1978 | Mogerlein | 242/107 |

*Primary Examiner*—John M. Jillions
*Attorney, Agent, or Firm*—Kerkam, Stowell, Kondracki & Clarke

[57] ABSTRACT

There is provided a winding spring for a seat belt winding apparatus which comprises an output drum and a take-up drum. The winding spring is stretched in the S-shaped form between the output drum and take-up drum. In the normal use region of the entire length of the winding spring, the natural radius of curvature of the spring is gradually increased. In the surplus use region of the spring, the natural radius of curvature of the spring is divided into a part where it is gradually decreased and a part where it is kept constant. The natural radius of curvature in the free end portion of the winding spring is increased.

4 Claims, 5 Drawing Figures

WINDING SPRING FOR SEAT BELT WINDING APPARATUS

BACKGROUND OF THE INVENTION

The present invention relates to an improvement in a winding spring for a seat belt winding apparatus.

Ordinarily, a seat belt winding apparatus comprises an output drum, a take-up drum, a winding spring stretched and wound in the S-shaped form between said output drum and take-up drum, a belt winding drum disposed coaxially with said output drum and a webbing having one end fixed to said belt winding drum and wound on said belt winding drum. One end of the winding spring is fixed to the output drum, but the winding spring is set free to the take-up drum and such a curling property that the winding spring is naturally wound on the take-up drum to wind the webbing on the winding drum in the normal state, that is, a natural radius of curvature, is given to the winding spring. Accordingly, if the webbing is pulled out, the output drum is rotated with rotation of the winding drum and the spring is wound on the output drum from the take-up drum. When the pull-out force on the webbing is released, the winding spring is wound back on the take-up drum from the output drum to wind the webbing on the winding drum. In order not to impart a compressive force to a wearer when the webbing is pulled out and attached to the wearer, in conventional winding springs, the natural radius of curvature is gradually increased in the direction of or toward the take-up drum along the entire length of the spring proportionally to the pull-put length of the webbing, and negative spring characteristics varying linearly along the entire length are given to the spring. It will readily be understood that in such winding spring, when the webbing is pulled out completely to the final end thereof, rotation is caused in the take-up drum by inertia to loosen the surplus portion of the spring wound on the take-up drum. As a result, there is caused a phenomenon that the spring rises from the take-up drum. When this phenomenon takes place, the stretched portion of the spring where the return force is small becomes engaged with the inner face of a casing covering the output drum and take-up drum, and as a result, an operation trouble is caused to render winding of the webbing impossible.

A winding spring in which occurrence of the above-mentioned operation trouble is prevented was proposed by applicant in published Japanese Patent Application No. 55921/1979. According to this previously proposed invention, the natural radius of curvature given to the winding spring is gradually increased in the direction of or toward the take-up drum in the normal use region of the spring while the natural radius of curvature in the surplus use region is gradually decreased in the direction of or toward the take-up drum, and the return force of the spring to the take-up drum (the torque of the output drum) as one spring characteristic is gradually decreased in the normal use region and gradually increased in the surplus use region. In the winding spring having this structure, even if the webbing is abruptly pulled out to the final end at a speed of, for example, about 8 m/sec carelessly, since a sufficient winding force, that is, a holding force, preventing rotation of the take-up drum by inertia is given to the surplus region of the spring wound on the take-up drum, the above-mentioned operation trouble is not caused at all. However, if the webbing is pulled out suddenly to the final end thereof at such a high speed as exceeding 8 m/sec, though such seldom takes place, the take-up drum is rotated by inertia against the winding force of the spring to the take-up drum, and the spring is loosened around the take-up drum in the same manner as described above and becomes engaged with the inner face of the casing, resulting in occurrence of the above-mentioned operation trouble. The inventor made researches with a view to clarifying why such undesirable phenomenon takes place, and as a result, it was found that since the surplus region of the spring on the take-up drum holds the take-up drum too strongly, the free end of the spring is caught on the drum surface and when the take-up drum is turned by inertia, the free end is rotated together with the take-up drum to loosen the portion of the spring wound on the take-up drum and causes the above-mentioned undesirable phenomenon. Occurrence of this phenomenon is especially conspicuous when a burr directed to the take-up drum is formed on the cut edge of the free end of the spring at the shear processing step.

SUMMARY OF THE INVENTION

It is a primary object of the present invention to eliminate the above-mentioned effect and provide a winding spring in which the above-mentioned oeration trouble is not caused even when the webbing is abruptly pulled out to the final end at a speed higher than 8 m/sec.

In accordance with the present invention, this object can be attained by a winding spring in which in the normal use region of the entire length of the winding spring, the natural radius of curvature of the spring is gradually increased in the direction of or toward the take-up drum, and in the surplus use region, the natural radius of curvature of the spring is divided into a part where it is gradually decreased in the direction of or toward the take-up drum and a part where it is kept constant, and the natural radius of curvature in the free end portion of the winding spring is increased. The free end portion of the spring where the natural radius of curvature is increased holds the take-up drum with a small force sufficient to prevent the free end from being caught on the take-up drum. This holding force may be further reduced, and this can be attained by reducing the natural radius of curvature in the free end portion to zero.

In a preferred embodiment of the present invention, if the diameters of the take-up drum and output drum are 34 mm and 46 mm, respectively, and the dimension of the spring is 0.13 mm × 13 mm × 2960 mm, in the normal use region the natural radius of curvature is gradually increased in the direction of or toward the take-up drum from about 10 mm to 30 mm and in the surplus use region the natural radius of curvature is gradually decreased in the direction of or toward the take-up drum from 30 mm to about 10 mm. In an example where the natural radius of curvature of the free end portion is increased, the length of the free end portion is preferably 50 mm from the free end and in this free end portion, the natural radius of curvature is increased from the above-mentioned minimum value to 25 mm.

DESCRIPTION OF THE DRAWINGS

Other objects and advantages of the present invention will become apparent from the following description made with reference to the accompanying drawings, in which.

DESCRIPTION OF THE PREFERRED EMBODIMENT

One embodiment of the present invention will now be described in detail with the reference to the accompanying drawings.

Figure 1:
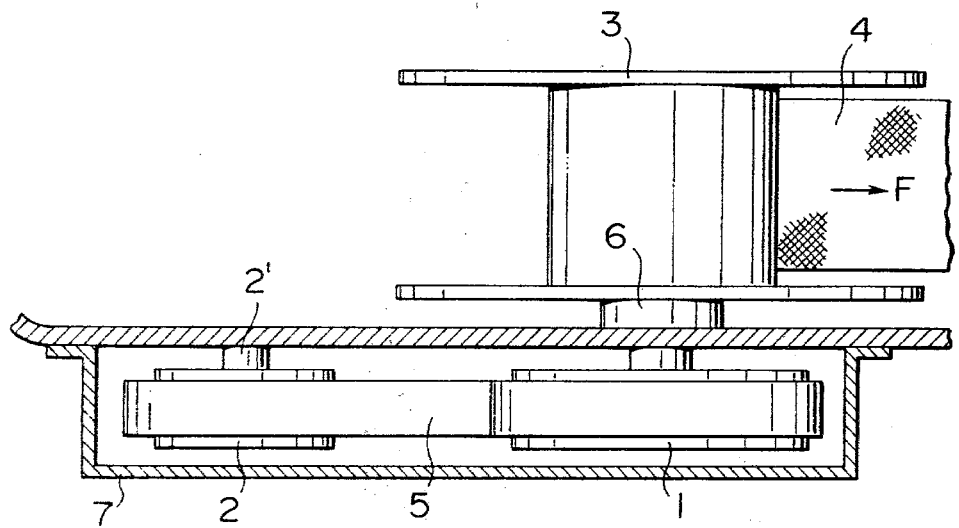
FIG. 1 is a partially sectional plan view showing a seat belt winding apparatus provided with the winding spring of the present invention.
Figure 2:
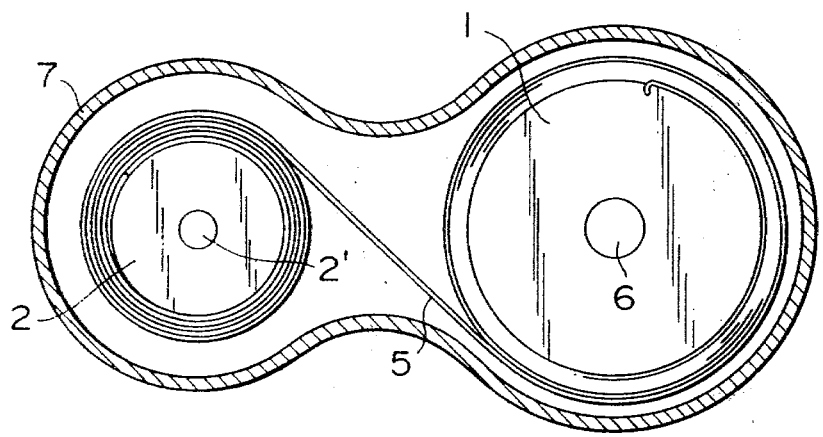
FIG. 2 is a side view illustrating the winding apparatus shown in FIG. 1.
Figure 3:
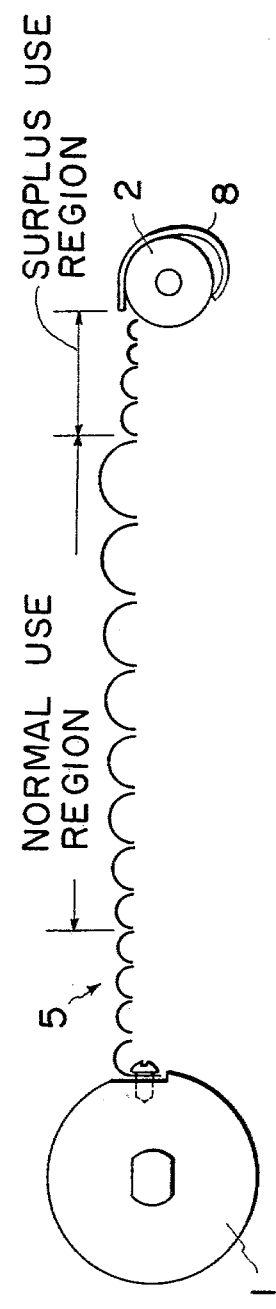
FIG. 3 is a view showing the varying radii of curvature of the spring.

Referring to FIGS. 1 and 2, reference numeral 1 represents an output drum and a take-up roller 2 is mounted on a shaft 2', and a belt winding drum 3 is mounted on a shaft 6 coaxially with the output drum 1. One end of a webbing 4 is fixed to the belt winding drum 3 and the webbing 4 is wound on the belt winding drum 3. One end of a winding spring 5 is fixed to the output drum 1 and the spring 5 is stretched in the S-shaped form between the output drum 1 and the take-up drum 2 so that the other end of the winding spring 5 is kept free to the take-up drum 2. A casing 7 is disposed to surround the output drum 1 and take-up drum 2. The winding spring has a curling property such that the winding spring 5 is naturally wound on the take-up drum 2 in the normal state to wind the webbing 4 on the winding drum 3, that is, a natural radius of curvature, is given to the winding spring 5. As can be seen in FIG. 3, this natural radius of curvature of the spring 5 is gradually increased in the direction or toward the take-up drum 2 in the normal use region, and in the surplus use region, namely in the portion always wound on the take-up drum 2, the natural radius of curvature is gradually decreased in the direction or toward the take-up drum 2 to a constant level. Accordingly, the return force of the spring 5 toward the take-up drum 2 (that is, the torque of the output drum 1) is gradually decreased in the normal use region and is gradually increased in the surplus use region.

When the webbing 4 is pulled out in a direction of arrow F from the belt winding drum 3, the spring 5 is wound on the side of the output drum 1 from the side of the take-up drum 2 against the return force of the spring 5. When the force of pulling out the wbbing 4 is released, a rotating force is given to the output drum 1 and hence, to the winding drum 3, and the pulled-out webbing 4 is wound on the winding drum 3.

Figure 5:
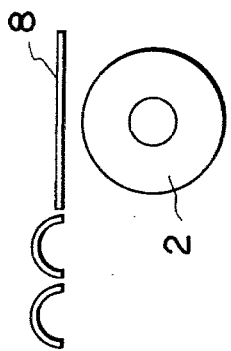
FIGS. 4 and 5 are views showing the relationship between the free end portion of the spring and the take-up drum.
Figure 4:
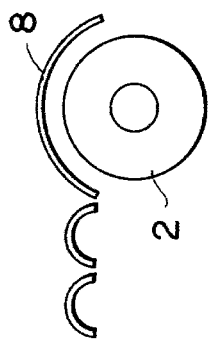

According to the present invention, a curling property, that is, increase of the natural radius of curvature, is given to the free end portion of the winding spring 5 (see FIG. 4) or any natural radius of curvature is not given to the free end portion 8 of the spring 5 (see FIG. 5). Accordingly, the free end portion of the winding spring 5 lightly holds the take-up drum.

When the webbing 4 is abruptly pulled out beyond the normal use region to the final end thereof at a speed, for example, exceeding 8 m/sec, the take-up drum 2 is rotated by inertia against the holding force of the spring 5. In this case, since the free end portion of the spring 5 has the above-mentioned specific structure, the free end of the spring 5 is not caught on the surface of the take-up drum 3 and hence, only the take-up drum 2 freely rotates. In the present invention, even if a burr directed to the take-up drum is present on the end face, that is, the cut end, of the spring 5, the above-mentioned effect can similarly be attained. It was found that when shearing processing is conducted on the spring 5 so that a burr directed opposite to the take-up drum, the effect is further enhanced and the upper limit of the pull-put speed is further increased.

In the winding spring of the present invention having the above-mentioned structure, even if the webbing is carelessly pulled out to the final end thereof at an unexpectedly high speed, rotation of the take-up drum by inertia has no influences of the surplus region of the spring on the take-up drum, and any operation trouble is not caused in returning of the webbing.

What is claimed is:

1. A spring motor for a seat belt winding apparatus comprising an output drum and a take-up drum, a winding spring having a stretched S-shaped form disposed between said output drum and said take-up drum, said winding spring having a normal use region made up of a portion of the entire length of the winding spring, the natural radius of curvature of the spring in said normal use region being gradually increased in the direction of the take-up drum, said spring having a surplus use region, the natural radius of curvature of the spring in the surplus use region being divided into a first part which in the direction of the take-up drum gradually decreases and a second part which is constant, and said spring having a free end portion, the natural radius of curvature of the free end portion of the winding spring being disposed on the take-up drum, the natural radius portion of the free end portion being greater than that of the first part or second part.

2. A spring motor for a seat belt winding apparatus comprising an output drum and a take-up drum, a winding spring having a stretched S-shaped form disposed between said outut drum and said take-up drum, said winding spring having a normal use region made up of a portion of the entire length of the winding spring, the natural radius of curvature in said normal use region being gradually increased toward the take-up drum, said spring having a surplus use region, the natural radius of curvature of the spring in the surplus use region being divided into a first part which gradually decreases toward the take-up drum and a second part which is constant, and said spring having a free end portion disposed on the take-up drum, the natural radius of curvature of the free end portion being reduced to zero.

3. A seat belt winding apparatus comprising a belt winding drum, a webbing having one end fixed to the drum and adapted to be wound thereabout, a first shaft on which said belt winding drum is mounted, an output drum mounted on a second shaft coaxial with said first shaft and operatively connected to said belt drum, and a take-up drum, a winding spring having a stretched S-shape form disposed between said output drum and said take-up drum, said winding spring having a normal use region made up of a portion of the entire length of the winding spring, the natural radius of curvature of the spring in said normal use region being gradually increased in the direction of the take-up drum, said spring having a surplus use region, the natural radius of curvature of the spring in the surplus use region eing divided into a first part which in the direction of the take-up drum gradually decreases and a second part which is constant, and said spring having a free end portion, the natural radius of curvature of the free end portion of the winding spring being disposed on the take-up drum, the natural radius portion of the free end portion being greater than that of the first part or second part.

4. A seat belt winding apparatus comprising a belt winding drum, a webbing having one end fixed to the drum and adapted to be wound thereabout, a first shaft on which said drum is mounted, output drum mounted on a second shaft coaxial with said first shaft and operatively connected to said belt drum, and a take-up drum, a winding spring having a stretched S-shape form disposed between said output drum and said take-up drum, said winding spring having a normal use region made up of a portion of the entire length of the winding spring, the natural radius of curvature in said normal use region being gradually increased toward the take-up drum, said spring having a surplus use region, the natural radius of curvature of the spring in the surplus use region being divided into a first part which gradually decreases toward the take-up drum and a second part which is constant, and said spring having a free end portion disposed on the take-up drum, the natural radius of curvature of the free end portion being reduced to zero.

* * * * *

UNITED STATES PATENT AND TRADEMARK OFFICE
CERTIFICATE OF CORRECTION

PATENT NO. : 4,253,620

DATED : March 3, 1981

INVENTOR(S) : Mitsuo Takei, et al

It is certified that error appears in the above–identified patent and that said Letters Patent are hereby corrected as shown below:

Claim 3, Column 4, line 64, correct spelling of "being" from "eing" to --being--.

Signed and Sealed this

Seventeenth Day of August 1982

[SEAL]

Attest:

GERALD J. MOSSINGHOFF

Attesting Officer — Commissioner of Patents and Trademarks